United States Patent
Olsen et al.

(10) Patent No.: US 7,970,765 B1
(45) Date of Patent: Jun. 28, 2011

(54) NETWORK DEVICE FOR PROVIDING INTEGRATED DNS CACHING SERVICES

(75) Inventors: Eskil H. Olsen, San Francisco, CA (US); Theron Tock, Mountian View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 229 days.

(21) Appl. No.: 11/374,861

(22) Filed: Mar. 14, 2006

(51) Int. Cl.
G06F 7/00 (2006.01)
(52) U.S. Cl. ....................................................... 707/737
(58) Field of Classification Search .................. 707/10, 707/737
See application file for complete search history.

(56) References Cited

U.S. PATENT DOCUMENTS

| | | | |
|---|---|---|---|
| 7,437,364 B1 * | 10/2008 | Fredricksen et al. .................. | 1/1 |
| 2004/0010562 A1 * | 1/2004 | Itonaga .......................... | 709/213 |
| 2004/0081203 A1 * | 4/2004 | Sodder et al. ................. | 370/469 |
| 2006/0002407 A1 * | 1/2006 | Sakamoto ..................... | 370/402 |

* cited by examiner

*Primary Examiner* — Greta L Robinson
*Assistant Examiner* — Jensen Hu
(74) *Attorney, Agent, or Firm* — Shumaker & Sieffert, P.A.

(57) ABSTRACT

This disclosure describes domain name system (DNS) caching techniques for providing integrated DNS caching services to multiple customers. For example, a virtual private network (VPN) device provides integrated DNS caching services to multiple customers even though each customer has a different corresponding VPN and may be serviced by a different DNS server. The VPN network device accesses the multiple, different DNS servers to retrieve correct IP addresses for the different customer VPNs, and internally stores the IP addresses in an integrated DNS cache in a manner that allows the IP addresses to be uniquely retrieved based on combinations of customer VPN identifiers and hostnames.

12 Claims, 3 Drawing Sheets

| VPN IDENTIFIER | HOSTNAME | IP ADDRESS(ES) |
|---|---|---|
| VPN 1 | FOO | 123.56.45.8 |
| VPN 1 | BAR | 155.48.2.130 |
| VPN 2 | FOO | 123.56.45.8 |
| VPN 3 | FOO | 5.112.58.22 |
| VPN N | FOO BAR | 58.112.1.0 - 58.112.1.9 |

| VPN IDENTIFIER | HOSTNAME | IP ADDRESS(ES) |
|---|---|---|
| VPN 1 | FOO | 123.56.45.8 |
| VPN 1 | BAR | 155.48.2.130 |
| VPN 2 | FOO | 123.56.45.8 |
| VPN 3 | FOO | 5.112.58.22 |
| VPN N | FOO BAR | 58.112.1.0 - 58.112.1.9 |

NETWORK DEVICE FOR PROVIDING INTEGRATED DNS CACHING SERVICES

TECHNICAL FIELD

This disclosure relates to computer networks and, more particularly, to techniques for providing domain name system (DNS) services within computer networks.

BACKGROUND

A domain name system (DNS) is a system that stores information associated with hostnames in a distributed database on networks, such as the Internet. In particular, the DNS system associates hostnames with corresponding Internet Protocol (IP) addresses. A set of hostnames belonging to an organization can be grouped into a domain by associating each of the hostnames of the organization with a common domain name. In this manner, DNS allows hard to remember IP addresses to be associated with easy to remember hostnames and/or domain names.

When a user of a computing device executes a client application, such as a web browser or email account, and makes a request that necessitates a DNS lookup, the client application sends a DNS lookup that includes a hostname to a DNS caching server. The DNS server retrieves the IP address associated with the hostname contained in the lookup. The DNS server returns the IP address to the client application, which uses the IP address to service the user's action.

Virtual private networks (VPNs) are often used to securely share data over a public network, such as the Internet. For example, a service provider may utilize VPN appliances to provide VPN services to customers. A customer, such as an enterprise that includes multiple geographically separated sites, each site including one or more computing devices, may establish a VPN to allow the computing devices to securely communicate through the Internet or another public network. In some situations, different customers may use the same hostnames to refer to computing devices within their respective VPNs. For example, an administrator of a first VPN may assign a hostname "exchange" to its mail exchange server and an administrator of a second VPN may assign the hostname "exchange" to its mail exchange server. Thus, to supply DNS services to customer VPNs, the service provider often maintains logically separate DNS servers for each of the customer VPNs in order to provide the proper IP addresses corresponding to common hostnames.

SUMMARY

This disclosure describes domain name system (DNS) caching techniques for translating hostnames into Internet Protocol (IP) addresses. For example, this disclosure describes an embodiment in which a virtual private network (VPN) device provides centralized DNS caching services to multiple customers even though each customer has a different corresponding VPN and may be serviced by different DNS servers. For example, the VPN device provides DNS caching services to client devices attempting to access the VPN associated with the customer from a public network, such as the Internet. The VPN device may provide DNS caching services to client devices in response to users initiating client applications that require DNS lookups, such as opening a web browser, sending an email, initiating a Telnet session or other similar application.

The VPN network device accesses the multiple, different DNS servers to retrieve correct IP addresses for the different customer VPNs, and internally stores the IP addresses in an integrated DNS cache in a manner that allows the IP addresses to be uniquely retrieved based on combinations of customer VPN identifiers and hostnames. Mapping VPN identifiers and hostnames to one or more corresponding IP addresses within the integrated cache allows the VPN network device to maintain a single DNS cache that includes entries for all the VPNs serviced by the VPN network device, thus reducing the memory space necessary to maintain the cache and otherwise conserving resources.

The VPN network device retrieves one or more IP addresses corresponding to VPN identifiers and hostnames from DNS servers when no entry exists in the DNS cache that maps a particular VPN identifier and hostname pair to one or more corresponding IP addresses. The VPN network device may, for example, identify DNS servers associated with the client devices initiating the DNS lookups, and retrieve the IP addresses from the corresponding DNS servers. Additionally, the VPN network device updates the DNS cache to include entries that map the VPN identifiers and hostnames to the IP addresses retrieved from the DNS servers. In this manner, the VPN network device acts as a DNS caching server for its VPN customers by providing an integrated DNS cache even though the different VPN customers may be serviced by separate DNS servers.

In one embodiment, a method comprises maintaining a domain name system (DNS) cache that maps virtual private network (VPN) identifiers and hostnames to corresponding Internet Protocol (IP) addresses, and providing DNS caching services to client devices of multiple customers using the DNS cache.

In another embodiment, a network device comprises a domain name system (DNS) cache that maps virtual private network (VPN) identifiers and hostnames to corresponding Internet Protocol (IP) addresses, and a DNS process that provides DNS caching services to multiple customers using the DNS cache.

In a further embodiment, a method comprises providing virtual private network (VPN) services to the multiple customers, wherein each of the customers is associated with a separate VPN, receiving a communication that includes a hostname from a client device belonging to one of the customers, associating the client device with a VPN identifier that identifies a VPN associated with the customer to which the client device belongs, retrieving an IP address corresponding to the VPN identifier and the hostname from a domain name system (DNS) cache that maps VPN identifiers and the hostnames to corresponding Internet Protocol (IP) addresses, and sending the retrieved IP address to the client device.

In yet another embodiment, a network device comprises a plurality of virtual private network (VPN) processes that provide VPN services to the multiple customers, wherein each of the VPN processes maintains a VPN associated with one of the customers, further wherein one of the VPN processes receives a communication that includes a hostname from a client device belonging to one of the customers and associates the client device with a VPN identifier that identifies a VPN associated with the customer to which the client device belongs. The network device further comprises a domain name system (DNS) cache that maps VPN identifiers and the hostnames to corresponding Internet Protocol (IP) addresses, and a DNS process that retrieves an IP address corresponding to the VPN identifier and hostname from the DNS cache and sends the retrieved IP address to the client device.

In another embodiment, a method comprises receiving a communication that includes a hostname from a client device, associating the client device with a customer identifier that identifies a customer to which the client device belongs, retrieving an Internet Protocol (IP) address corresponding to the customer identifier and hostname from a domain name system (DNS) cache that maps customer identifiers and the hostnames to corresponding IP addresses, and sending the retrieved IP address to the client device.

In a further embodiment, a computer-readable medium comprises instructions to cause a programmable processor to maintain a domain name system (DNS) cache that maps virtual private network (VPN) identifiers and hostnames to corresponding Internet Protocol (IP) addresses, and provide DNS caching services to client devices of multiple customers using the DNS cache.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
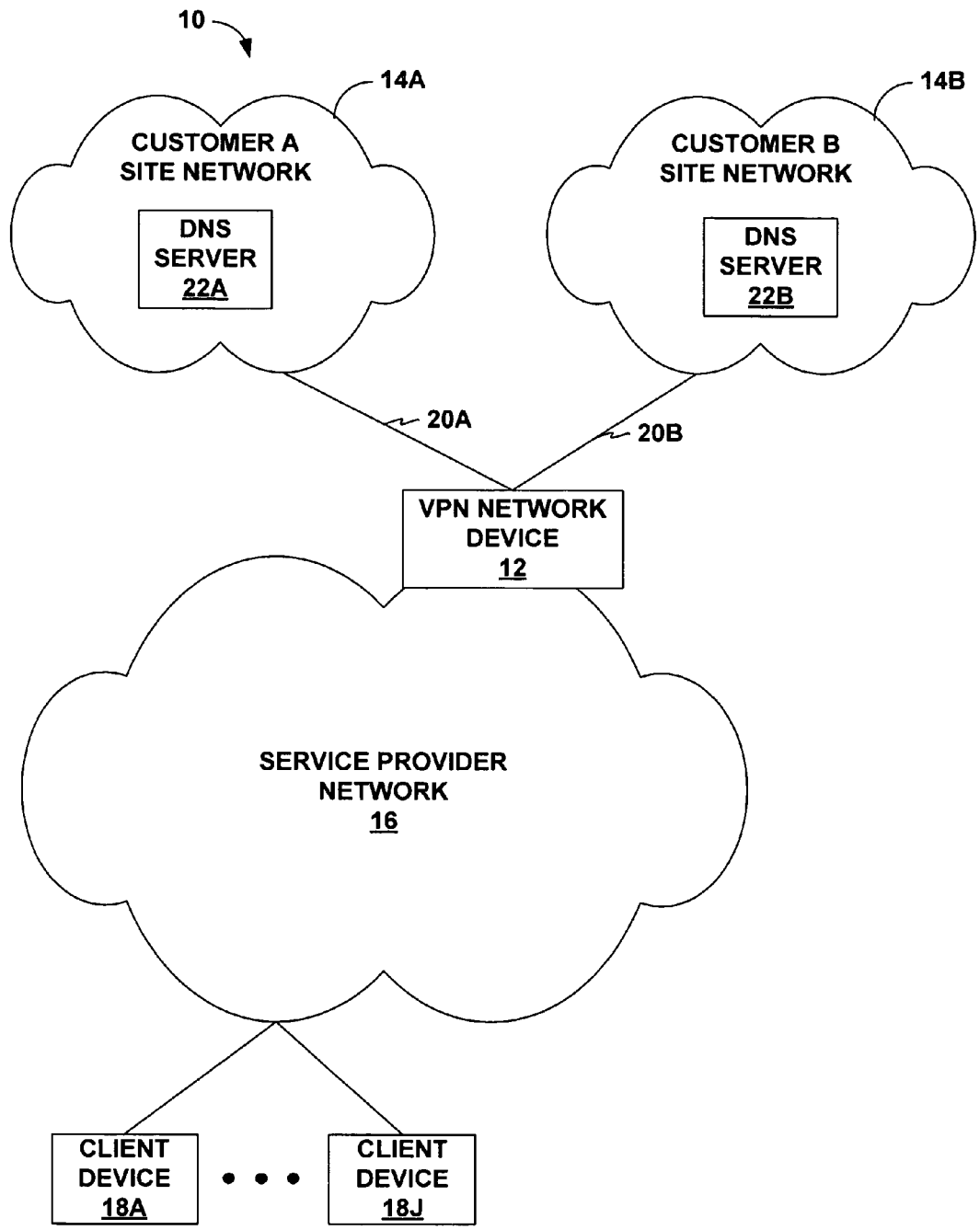
FIG. 1 is a block diagram illustrating an example system in which a virtual private network (VPN) device provides domain name system (DNS) caching services using an integrated cache.

FIG. 1 is a block diagram illustrating an example system 10 for providing integrated domain name system (DNS) caching services. System 10 comprises a virtual private network (VPN) device 12 that provides integrated DNS caching services to multiple customers. The principles of the invention are described in the context of a VPN network setting for exemplary purposes only. The principles are applicable, however, to any network device providing services to multiple customers that require logically separated DNS services.

VPN network device 12 couples customer site networks 14A and 14B ("customer site networks 14") to a service provider network 16. Service provider network 16 includes one or more autonomous systems (not shown) having a number of devices, such as routers and switches, used to forward packets across service provider network 16.

Customer site networks 14 may be geographically distributed sites of multiple customers. In the example of FIG. 1, customer site networks 14 include customer site networks for two customers: customer A and customer B. Although not illustrated in FIG. 1, customer A and customer B typically maintain more than one customer site network. For example, customer A may maintain customer site networks for each facility located in a different geographic area, e.g., in a different state or country. Customer site networks 14 may include one or more Local Area Networks (LANs), Wide Area Network (WANs), or the like. Although system 10 may include any number of customer site networks 14 coupled to service provider network 16 by any number of VPN network devices 12, FIG. 1, for simplicity, shows only two customer site networks 14 coupled to service provider network 16 by a single VPN network device 12. Each of customer site networks 14 connects to VPN network device 12 via one or more access links 20A and 20B ("access links 20").

Each of customer site networks 14 includes one or more DNS servers 22. In the example illustrated in FIG. 1, customer site network 14A includes DNS server 22A and customer site network 14B includes DNS server 22B. DNS servers 22 maintain resource records that contain information associated with particular hostnames. Each of DNS servers 22 maintains authoritative control of a portion (or zone) of the resource records associated with its corresponding customer. DNS server 22A, for example, maintains authoritative control of a zone of resource records associated with customer A, while DNS server 22B maintains authoritative control of a zone of resource records associated with customer B. In this manner, each of DNS servers 22 is associated with a particular customer and provides physical separation of the resource records for customers A and B. In other embodiments, DNS servers 22 may maintain authoritative control over zones of multiple customers, zones of public network devices or a combination thereof. DNS servers 22 use the resource records for which they have authoritative control to translate domain names into corresponding Internet Protocol (IP) addresses in response to DNS requests.

VPN network device 12 provides VPN services to customer site networks 14. In other words, VPN network device 12 allows customer site networks 14 to securely transmit packet flows between associated customer site networks (not shown in FIG. 1) via corresponding VPNs. VPN network device 12 may, for example, establish and maintain VPNs that correspond to customer site networks 14, such that each of the customers has its own VPN for securely communicating between its customer site networks. Customer site networks 14 may also communicate with remote network devices within service provider network 16 or other public network, such as the Internet. In other words, customer site networks 14 may also communicate with network devices that do not belong to its associated VPN. In one embodiment, VPN network device 12 comprises a secure socket layer (SSL) VPN appliance that provides instant virtual systems for subscribing customers.

As described herein, VPN network device 12 also provides DNS caching services to customer site networks 14. Particularly, VPN network device 12 provides integrated DNS caching services to client devices 18A-J ("client devices 18") in response to actions by client devices 18. VPN network device 12 may provide DNS caching services to customer site networks in response to users initiating client applications that require DNS lookups. Client applications that may require DNS lookups include, for example, opening a web browser, sending an email, initiating a Telnet session or other similar application. Client devices 18 may, for example, be computing devices located within a public network, such as the Internet. For example, client device 18A may be a remote computing device used by an employee of customer A to access the VPN associated with customer A from a remote location, such as the employee's home. Client devices 18 may include such devices as personal computers, laptop computers, handheld computers, workstations, servers, routers, switches, printers, fax machines, or the like.

VPN network device 12 services the client applications by identifying IP addresses corresponding to hostnames with which client devices 18 desire to communicate. VPN network device 12 may, for example, associate client devices 18 with VPN identifiers that uniquely identify VPNs provided by VPN network device 12 to which client devices 18 belong, retrieve IP addresses based on combinations of the VPN identifiers and hostnames, and return the IP addresses to the requesting client applications. In this case, VPN network device 12 may maintain an integrated DNS cache that maps VPN identifiers and hostname combinations to one or more corresponding IP addresses. The DNS cache may be viewed as an "integrated" DNS cache in that IP addresses for the different customer VPNs are internally stored in a common cache in a manner that allows the IP addresses to be uniquely retrieved based on combinations of customer VPN identifiers and hostnames even though the customers are serviced by physically separate DNS servers 14. Mapping VPN identifiers and hostname combinations to corresponding IP addresses allows VPN network device 12 to maintain a single DNS cache that includes entries for all the VPNs serviced by VPN network device 12, thus reducing the memory space or other resources necessary to maintain the cache.

VPN network device 12 may also retrieve IP addresses corresponding to VPN identifiers and hostnames from DNS servers 22. For example, VPN network device 12 may determine that no entry exists in the DNS cache that maps a particular VPN identifier and hostname pair to a corresponding IP address, and retrieve the IP address from the one of DNS servers 22. Specifically, VPN network device 12 identifies which of DNS servers 22 is associated with client devices 18 initiating the DNS lookups, and retrieves the IP addresses from the corresponding DNS servers 22. For example, if an action by client device 18A initiated the DNS lookup, VPN network device 12 retrieves one or more corresponding IP addresses from DNS server 22A. VPN network device 12 returns one or more corresponding IP addresses to the client applications executing on client devices 18. Additionally, VPN network device 12 updates the DNS cache to include entries that map the VPN identifiers and hostnames to the retrieved IP addresses. In this manner, VPN network device 12 acts as a DNS caching server for its VPN customers by providing an integrated DNS cache even though the different VPN customers may be serviced by separate DNS servers.

Figures 2, 3:
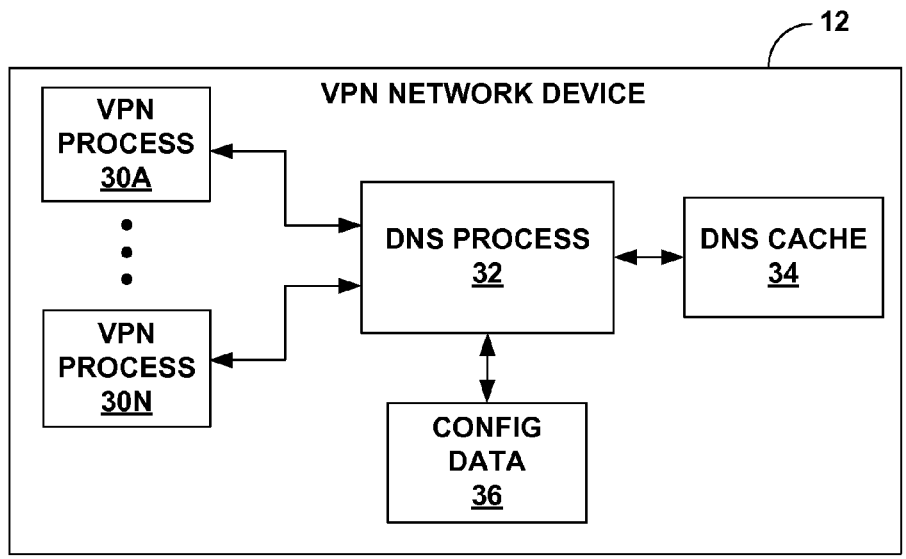
FIG. 2 is a block diagram illustrating an example embodiment of the VPN device in further detail.
FIG. 3 is a block diagram illustrating an exemplary integrated DNS cache data structure maintained by the VPN network device.

FIG. 2 is a block diagram illustrating VPN network device 12 of FIG. 1 in further detail. VPN network device 12 provides VPN services as well as DNS caching services to client devices 18 of customer networks 14 (FIG. 1). VPN network device 12 includes VPN processes 30A-30N ("VPN processes 30"), a DNS process 32, a DNS cache 34 and configuration data 36 (labeled "CONFIG DATA 36" in FIG. 2).

VPN network device 12 maintains VPNs for customers coupled to VPN network device 12 to allow the customers to securely communicate between associated customer site networks. As described above, VPN network device 12 may maintain a separate VPN for each customer coupled to VPN network device 12. Specifically, VPN network device 12 executes VPN processes 30 to maintain state data necessary to provide VPN services for the customer site networks 14. In this manner, VPN network device 12 may execute a plurality of software processes providing virtual systems for a plurality of different customers. VPN processes 30 switch contexts between the different VPNs to service the VPNs based on the state data. VPN state data maintained by VPN processes 30 may include, for example, address ranges associated with client devices 18 located within the each VPN, site identifiers that identify the customer site networks that are part of each VPN, MAC addresses for the client devices located within the customer sites of each VPN and the like.

VPN network device 12 accesses DNS servers 22 (FIG. 1) to retrieve correct IP addresses for the different customer VPNs, and internally stores the IP addresses in an integrated DNS cache 34 in a manner that allows the IP addresses to be uniquely retrieved based on combinations of customer VPN identifiers and hostnames. In this manner, VPN network device provides integrated DNS caching services to client devices 18 of customer site networks 14.

VPN network device 12 provides integrated DNS caching services to client devices 18 of customer site networks 14 in response to particular actions by the client devices 18. As described above, for example, VPN network device 12 may provide DNS services to respond to lookup requests initiated by client applications executing on remote client devices 18, such as web browsers, Telnet sessions and the like. The techniques will be described with reference to an action initiated by remote client device 18A for exemplary purposes.

One of the VPN processes 30, such as VPN process 30A, receives a DNS lookup communication from a client application running on remote client device 18A. When servicing the DNS lookup communication, VPN process 30A associates client device 18A with a VPN identifier associated with the VPN to which client device 18A belongs. In this example, the VPN identifier corresponds to the VPN to which customer A is associated. VPN process 30A sends an interprocess communication to DNS process 32 that includes the VPN identifier associated with client device 18A and the hostname included in the DNS lookup communication received from the client application executing on client device 18A.

DNS process 32 retrieves an IP address that corresponds to the VPN identifier and hostname combination, and returns the IP address to VPN process 30A. DNS process 32 either retrieves the IP address from DNS cache 34 or directly from one of DNS servers 22. DNS cache 34 maintains mappings that uniquely associate combinations of VPN identifiers and hostnames to cache entries storing corresponding IP addresses. DNS process 32 may, for example, use a hashing function to obtain a hash value and compare the hash value to entries in DNS cache 34 to determine whether there is a mapping associated with the VPN identifier and hostname specified by VPN process 30A. If DNS cache 34 includes an entry that maps the VPN identifier and hostname combination to a corresponding IP address, DNS process 32 returns the corresponding IP address to the requesting client application.

If DNS cache 34 does not include an entry that maps the VPN identifier and hostname combination to a corresponding IP address, DNS process 32 retrieves an IP address corresponding to the combination of VPN identifier and hostname from a DNS server. Particularly, DNS process 32 identifies the DNS server associated with the customer to which client device 18A belongs (in this case, DNS server 22A), and send a DNS request to the identified DNS server. DNS process 32 may, for example, access configuration data 36 to identify which of the DNS servers corresponds to the customer to which client device 18A belongs. Configuration data 36 is typically defined by a system administrator, such as the administrator of VPN network device 12, the administrator of customer networks 14 or both, and may include, for example, the VPN processes, domains, domain name servers associated with the VPN processes, and other configuration information necessary for operation of VPN network device 12. In one embodiment, DNS process 32 identifies the DNS server that corresponds to the customer to which client device 18A belongs based on the VPN identifier associated with client device 18A.

DNS process 32 receives a response from DNS server 22A. The response from DNS server 22A may include one or more IP addresses associated with the hostname or a no-such-host reply if DNS server 22 does not have an entry for the hostname contained in the DNS request. DNS process 32 updates DNS cache 34 to include an entry that maps the VPN identifier and hostname combination contained in the original interprocess communication from VPN process 30A to the IP address contained in the response from DNS server 22A. DNS process 32 forwards the IP address to the requesting client application of client device 18A. Alternatively, DNS process 32 forwards the IP address to VPN process 30A, which in turn forwards the IP address to the requesting client application.

VPN network device 12 may include an operating system (not shown) that provides a multi-tasking operating environment for execution of a number of concurrent processes, including VPN processes 30 and DNS process 32. An example of such an operating system is FreeBSD, which is an advanced UNIX operating system that is compatible with a number of programmable processors, including commercially available processors.

VPN network device 12 may operate according to executable instructions fetched from a computer-readable medium (not shown). Examples of such media include random access memory (RAM), read-only memory (ROM), non-volatile random access memory (NVRAM), electrically erasable programmable read-only memory (EEPROM), flash memory, and the like. The functions of VPN network device 12 may be implemented by executing the instructions of the computer-readable medium with one or more processors, discrete hardware circuitry, firmware, software executing on a programmable processor, or a combination of any of the above.

FIG. 3 is a block diagram illustrating an exemplary DNS cache data structure 40 maintained by VPN network device 12. DNS cache data structure 40 may, for example, represent DNS cache 34. In the embodiment illustrated in FIG. 3, DNS cache data structure 40 is a table in which each row represents a cache entry that maps a VPN identifier and a hostname combination to one or more corresponding IP addresses.

As described above, the VPN identifier identifies the VPN to which a requesting client device belongs and the hostname identifies the hostname of the destination device that requesting client device wants to contact. The VPN identifier is typically determined by a system administrator, and may either be a numerical identifier, textual identifier or a combination thereof. In the example illustrated in FIG. 3, the VPN identifiers are simple combination textual and numerical identifiers; "VPN 1," "VPN 2," "VPN 3," and the like. The VPN identifiers may, however, be textual identifiers such as a customer's names or strictly numerical identifiers.

As illustrated in FIG. 3, DNS cache data structure 40 may include more than one mapping for a single VPN identifier. As an example, DNS cache data structure 40 includes two mappings for VPN identifier "VPN 1"; one mapping that maps VPN identifier "VPN 1" and hostname "FOO" to IP address 123.56.45.8 and another mapping that maps VPN identifier "VPN 1" and hostname "BAR" to IP address 155.48.2.130. DNS cache data structure 40 may also include more than one mapping for a single hostname. For example, DNS cache data structure 40 includes three mappings for hostname "FOO"; one mapping that maps VPN identifier "VPN 1" and hostname "FOO" to IP address 123.56.45.8, a second mapping that maps VPN identifier "VPN 2" and hostname "FOO" to IP address 123.56.45.8 and a third mapping that maps VPN identifier "VPN 3" and hostname "FOO" to IP address 5.112.58.22. DNS cache data structure 40 may also include more than one IP address that corresponds to a particular VPN identifier and hostname combination. As illustrated in FIG. 3, VPN identifier "VPN N" and hostname "FOO BAR" map to a plurality of IP addresses, in this case a range of addresses.

DNS process 32 (FIG. 2) updates DNS cache data structure 40 to maintain accurate mappings. DNS process 32 updates DNS cache data structure 40 upon retrieving an IP address from one of DNS servers 22, as described in detail above. Additionally, DNS process 32 may eliminate an entry in DNS cache data structure 40 after a particular period of time. For example, DNS process 32 may eliminate an entry of DNS cache data structure upon expiration of a time-to-live (TTL).

The data of FIG. 3 is illustrated for exemplary purposes, and may be varied in other embodiments. For example, DNS cache data structure 40 may include additional information, such as a DNS server identifier that identifies the DNS server that is associated with a particular VPN identifier.

Figure 4:
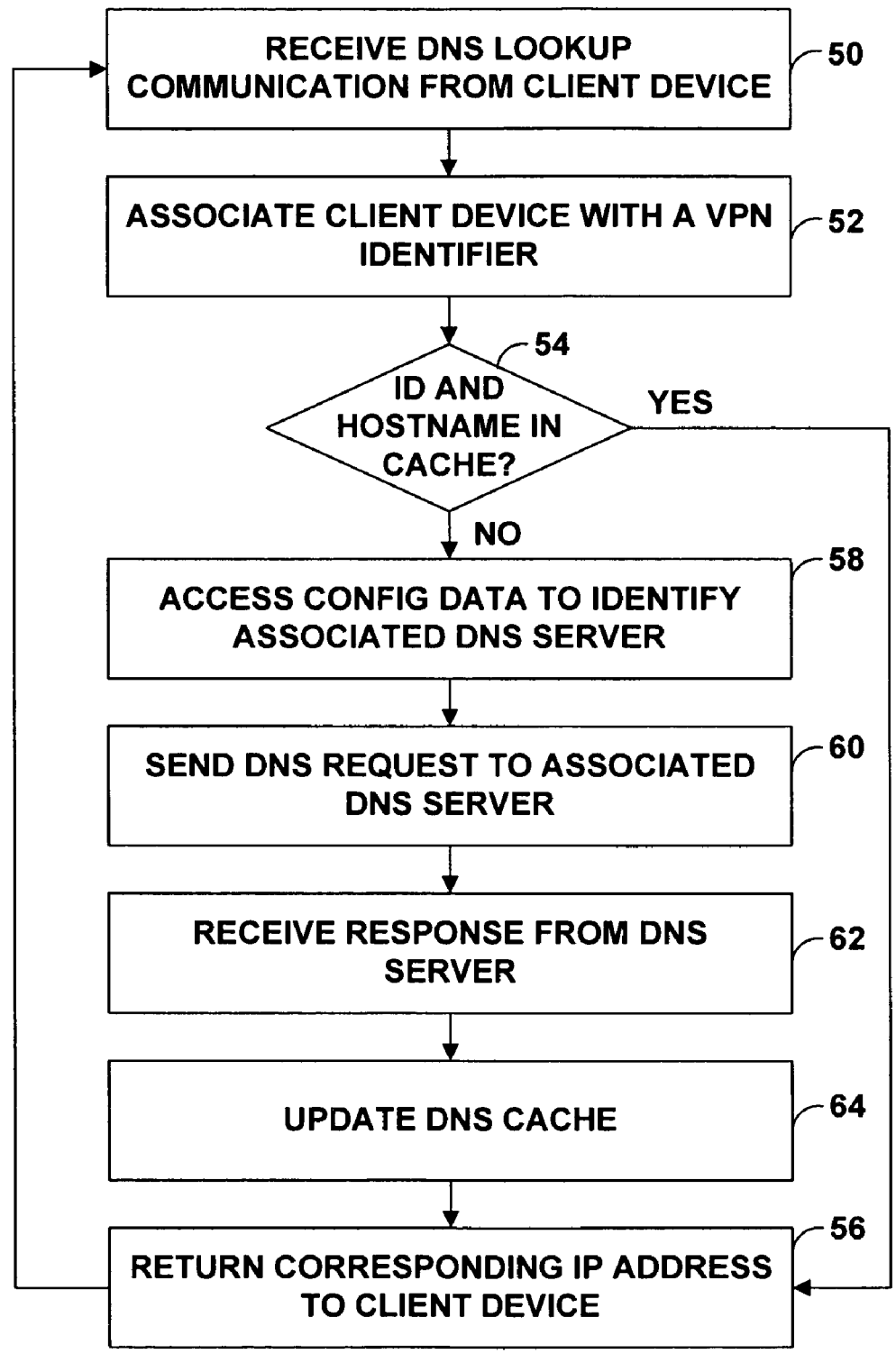
FIG. 4 is a flow diagram illustrating example operation of the VPN network device providing DNS services to multiple customers.

FIG. 4 is a flow diagram illustrating an example operation of VPN network device 12 providing DNS services to multiple customers. VPN network device 12 receives a DNS lookup communication from a client application executing on one of client devices 18, such as client device 18A (50). The DNS lookup communication includes a hostname associated with a destination device with which requesting client device 18A wants to communicate. VPN network device 12 associates a VPN identifier with requesting client device 18A (52).

VPN network device 12 determines whether DNS cache 34 contains an entry that maps the VPN identifier and hostname combination to a corresponding IP address (54). If DNS process 32 identifies an entry in DNS cache 34 that maps the VPN identifier and hostname combination to a corresponding IP address, DNS process 32 responds to the requesting client application of client device 18A with the IP address corresponding to the hostname provided in the request (56).

If DNS process 32 determines that no entry exists in DNS cache 34 that maps the VPN identifier and hostname combination to an IP address, then DNS process 32 retrieves the IP address corresponding to the hostname from one of DNS servers 22 (FIG. 1). Specifically, VPN network device 12 accesses configuration data to identify a DNS server associated with the customer to which client device 18A belongs, DNS server 22A in this example (58). For example, VPN network device 12 may identify the associated DNS server based on the VPN identifier assigned to client device 18A. DNS process 32 sends a DNS request to DNS server 22A that includes the hostname (60).

DNS process 32 receives a response from DNS server 22A that includes an IP address corresponding to the hostname (62), and updates DNS cache 34 to include an entry that maps the VPN identifier and hostname to the IP address contained in the response from DNS server 22A (64). DNS process 32 forwards the IP address to the requesting client application of client device 18A (56).

As described above, the techniques of this disclosure are described in the context of a VPN network setting for exemplary purposes only. The principles are applicable to any network device providing services to multiple customers that require logically separated DNS services. In those cases, for example, the DNS cache may map customer identifiers and hostname combinations to corresponding IP addresses instead of mapping VPN identifiers and hostname combinations to corresponding IP addresses. Various embodiments of the invention have been described. These and other embodiments are within the scope of the following claims.

The invention claimed is:

1. A method comprising:
   maintaining an integrated domain name system (DNS) cache within a virtual private network (VPN) device that provides VPN services to a plurality of subscribing customers, each of the customers having different customer networks and a corresponding DNS server that maintains hostname information for the respective customer, wherein the DNS cache includes a table having a plurality of entries, each of the entries storing a combination of a VPN identifier and a hostname and a corresponding Internet Protocol (IP) address, and wherein the stored combinations within the DNS cache include at least two combinations that have different VPN identifiers and the same hostnames, and wherein the DNS cache maps the at least two combinations to a same IP address;

receiving a communication that includes a hostname from one of the client devices;

associating the client device with one of the VPN identifiers;

accessing the table to determine whether an entry exists that matches the combination of the associated VPN identifier and the hostname received from the client device;

retrieving, from the table, an IP address corresponding to the combination of the associated VPN identifier and the hostname received from the client device upon identifying a matching entry exists;

upon identifying no matching entry exists, the VPN device identifying the corresponding DNS server associated with the customer to which the client device belongs, retrieving, from the identified DNS server, an IP address corresponding to the combination of the associated VPN identifier and the hostname received from the client device, and updating the table to include an entry that maps the associated VPN identifier and the hostname to the IP address retrieved from the DNS server; and sending the retrieved IP address to the client device from which the communication was received.

2. The method of claim 1, wherein retrieving the IP address from the DNS server further comprises retrieving the IP address from a DNS server associated with the VPN identifier.

3. The method of claim 1, further comprising providing VPN services to the plurality of subscribing customers.

4. The method of claim 3, wherein providing VPN services to the plurality of subscribing customers comprises maintaining a VPN associated with each of the plurality of subscribing customers.

5. A network device that provides virtual private network (VPN) services to a plurality of subscribing customers, each of the customers having different customer networks and a corresponding DNS server that maintains hostname information for the respective customer networks, the network device comprising:

a computer-readable medium storing configuration data that identifies the DNS server associated with each of the customer networks;

a programmable processor;

a domain name system (DNS) cache that includes a table having a plurality of entries, each of the entries storing a combination of a VPN identifier and a hostname and a corresponding Internet Protocol (IP) address, wherein the stored combinations within the DNS cache include at least two combinations that have different VPN identifiers and the same hostnames, and wherein the DNS cache maps the at least two combinations to a same IP address; and a DNS process configured to execute on the programmable processor to provide DNS caching services to multiple customers using the DNS cache, wherein the network device receives a communication that includes a hostname from one of the client devices and associates the client device with one of the VPN identifiers that identifies the VPN to which the client device belongs, wherein the DNS process accesses the table to determine whether an entry exists that matches the combination of the associated VPN identifier and the hostname received from the client device, wherein, when a matching entry exists within the table, the DNS process retrieves an IP address corresponding to the combination of the associated VPN identifier and the hostname received from the client device from the DNS cache and sends the retrieved IP address to the client device from which the communication was received, and wherein, when a matching entry does not exist, the DNS process accesses the configuration data and identifies the corresponding DNS server associated with the customer to which the client device belongs, retrieves an IP address corresponding to the combination of the associated VPN identifier and the hostname received from the client device from a DNS server and updates the table to include an entry that maps the combination of the associated VPN identifier and the hostname received from the client device to the IP address retrieved from the DNS server.

6. The network device of claim 5, further comprising a plurality of VPN processes that provide VPN services to the multiple customers, wherein each of the VPN processes maintains a VPN associated with one of the customers.

7. The method of claim 1 wherein retrieving the IP address from the DNS server associated with the customer further comprises accessing configuration data to identify the DNS server associated with the customer.

8. A virtual private network (VPN) device comprising:

one or more programmable processors;

a plurality of virtual private network (VPN) processes configured to execute on the one or more programmable processors to provide VPN services to a plurality of subscribing customers, each of the customers having different customer networks and a corresponding DNS server that maintains hostname information for the respective customer, wherein one of the VPN processes receives a communication that includes a hostname from a client device belonging to one of the customers and associates the client device with a VPN identifier that identifies a VPN associated with the customer to which the client device belongs;

a domain name system (DNS) cache that includes a table having a plurality of entries, each of the entries storing a combination of a VPN identifier and a hostname and a corresponding Internet Protocol (IP) address; and a DNS process that retrieves, from the table, an IP address corresponding to a combination of the VPN identifier associated with the client and hostname received from the client and sends the retrieved IP address to the client device, wherein, when the table does not include an entry that stores the VPN identifier and the hostname received from the client, the DNS process retrieves an IP address for the hostname from a DNS server and updates the table to include an entry that stores the VPN identifier, the hostname received from the client device and the IP address retrieved from the DNS server.

9. The VPN device of claim 8, further comprising configuration data that identifies DNS servers associated with the customers, wherein the DNS process accesses the configuration data to identify the DNS server associated with the customer to which the client device belongs.

10. The VPN device of claim 8, further comprising configuration data that identifies DNS servers associated with the VPN identifiers, wherein the DNS process accesses the configuration data to identify the DNS server associated with the VPN identifier.

11. The VPN device of claim 8, wherein the VPN process that received the communication sends an interprocess communication containing the VPN identifier and hostname to the DNS process.

12. The method of claim 1, wherein the stored combinations including at least two combinations that have different VPN identifiers and the same hostnames, and the DNS cache maps the at least two combinations to different corresponding IP addresses.

* * * * *